United States Patent [19]

Mallett

[11] 4,320,391
[45] Mar. 16, 1982

[54] INSTRUMENTATION DEVICES USING SYNCHRO-RESOLVER DRIVE CIRCUITRY

[75] Inventor: John H. Mallett, Brighton, England

[73] Assignee: The Singer Company, Binghamton, N.Y.

[21] Appl. No.: 102,707

[22] Filed: Dec. 12, 1979

[51] Int. Cl.³ .............................................. H03K 13/02
[52] U.S. Cl. ............................... 340/347 SY; 318/605; 340/347 M; 332/41; 364/606
[58] Field of Search .................. 318/599, 605, 661; 364/603, 602, 606, 842, 118; 340/347 M, 347 SY, 347 DA; 332/16 R, 21, 22, 40, 41

[56] References Cited

U.S. PATENT DOCUMENTS 3,798,430 3/1974 Simon et al. .................... 318/661

Primary Examiner—Thomas J. Sloyan
Attorney, Agent, or Firm—Jeff Rothenberg; Stephen C. Kaufman

[57] ABSTRACT

Circuitry for producing the signals necessary for driving and controlling a synchro-resolver is disclosed. The circuitry includes a reference generator (84) which is driven by an AC reference signal and thus, the resulting output DC reference voltage on line (82) is locked to the AC reference signal. The DC reference voltage is then combined with a computer generated digital command signal by a MDAC (Multiplying Digital to Analog Converter) (74) to provide a control signal which varies around a selected reference level. A pulse-width modulator (112) provides a high frequency square wave output which square wave is pulse-width-modulated by the AC reference voltage. The pulse-width-modulated high frequency square wave is then provided to an amplitude modulator circuit (106) where the high frequency square wave is itself amplitude modulated by the control signal. The output of the amplitude modulator is then passed through a four-pole, low pass filter (114) to obtain an AC amplitude modulated signal which has had substantially all of the high frequency components eliminated. The AC amplitude modulated signal is then provided to a power amplifier (116) which in turn drives one of the resolver coils (117).

8 Claims, 12 Drawing Figures

INSTRUMENTATION DEVICES USING SYNCHRO-RESOLVER DRIVE CIRCUITRY

DESCRIPTION

1. Technical Field

This invention relates generally to drive circuits for synchro-resolvers and more particularly to snychro-resolvers used in the field of avionics, and aviation, or in the simulation of such avionic and aviation equipment. The synchro-resolver drive circuitry of the invention is specifically applicable to such equipment which is susceptible to AC and computer update rate feedthrough.

2. Background Art

Since the direction and attitude of a modern aircraft is substantially unrestricted, many if not most flight instruments located in the aircraft, such as the directional indicator and the attitude indicators must also be unrestricted in their presentation. For these purposes, instruments controlled by devices such as electro-mechanical potentiometers and the like have been found to be unsuitable. Such potentiometers are typically limited to something less than 360-degree rotation. Even for those potentiometers which can exceed 360°, there is often still some limitation on the rotation. Therefore, if potentiometers are used they often must be reset. Even though such resetting can be done automatically, there is still an interruption of the instrument while the resetting is being accomplished. Potentiometers may also manifest reliability problems over an extended lifetime. Therefore, as will be appreciated by those skilled in the art, the synchro-resolver can be used as a suitable and reliable instrument drive which is not limited in its rotation, and which consequently does not result in an interrupted instrument presentation.

As is well known by those skilled in the art, many synchro-resolver drive circuits are simply Analog Multiplying Converters (AMC) which typically combine an AC reference signal with a control signal. The output from the AMC is then typically provided to a power amplifier which drives one of the resolver coils.

Another typical drive circuitry which is useful with digital drive signals is shown in the prior art circuitry of FIG. 1. According to this prior art circuitry, MDAC (Multiplying Digital to Analog Converter) 20 receives and converts the received digital data to a varying DC signal. The varying DC signal is combined with a 400 Hz reference signal received on line 22, and the output provided to a Power Amplifier 23 which in turn drives the resolver coil. The phase of the 400 Hz reference signal may be substantially phase-shifted 180° by switching circuitry 24 which is controlled by the sign bit of the digital signal. The 180° phase-shift is accomplished by providing a first 400 Hz signal from a suitable 400 Hz source at port 26. This signal is designated as the 0° phase. The 400 Hz 0° phase signal is also provided to an inverter 28. The output of inverter 28 is a 400 Hz signal having a phase which is shifted 180° from the reference signal, and which is provided to switch 24 at port 30. Although the simple prior art system of FIG. 1 may be useful for many avionic applications, it is not suitable for high accuracy systems such as digital computer driven simulator systems. The problem of using such a system with digital computer driven signals is that the computer update signals to MDAC 20 typically occur at a rate of about 10 Hz. Consequently, there is produced stepping of the instrument which cannot easily or effectively be filtered since the AC reference voltage is 400 Hz.

The more complex synchro-resolver prior art drive circuit shown in FIG. 2 can incorporate a filter to eliminate the 10 Hz computer update step rate signal. According to this technique, the parallel digital control signal is received by an MDAC 32 which converts the digital signal to a variable DC signal and combines it with a reference DC signal, such as for example 10 volts. Thus, the output of MDAC 32 is a DC signal which varies around the selected reference voltage. This output is then applied to input 34 of switching circuit 36, and to the input of inverter 38. The output of inverter 38 is applied to the second input 40 of switching circuit 36. The sign bit of the digital signal controls switch 36 to determine whether a positive or negative control signal is applied to filter 42. Filter 42 may be selected to filter out the computer update stepping rate. The output of filter 42 is then applied as the modulating input of Amplitude Modulator 44. The other input or "carrier" is a 400 Hz signal such that the output of power amplifier 46 is a 400 Hz signal modulated by the filtered variable DC voltage. Unfortunately, even though the driving circuitry of this prior art system does have some filtering, there is still substantial AC feedthrough and significant difficulty in aligning and calibrating the circuitry.

In addition to the feedthrough problems discussed above with the prior art circuitry, the accuracy of most snychro-resolvers also suffer from lack of a closed loop or feedback circuit. The use of a feedback circuit with the prior art systems of FIG. 1 and 2 has been found to be just too expensive and inefficient to make such feedback circuits clearly worthwhile.

DISCLOSURE OF THE INVENTION

Therefore, it is an object of this invention to provide a resolver drive circuit which does not pass stepping noises due to computer update data.

It is another object of this invention to provide a resolver drive circuitry which is simple to adjust and calibrate.

It is yet another object of this invention to substantially eliminate unnecessary feedthrough voltages.

It is also an object of this invention to provide a closed loop system having greater accuracy and reduced drive current and heating requirements.

Briefly, the drive circuitry of this invention includes circuitry, such as for example, a MDAC, for receiving and combining a DC reference voltage and an input command signal. The DC reference voltage is preferably referenced to a selected AC signal, and the input command signal is typically from a computer. The MDAC or a similar means provides a DC referenced command signal which is a variable DC signal which varies around the DC reference level in response to the input command signal. There is also included a means for providing the AC reference signal, which reference signal typically will have a selected amplitude and a selected frequency rate. A modulator such as a pulse-width modulator provides a pulse-width modulated square wave output, which has a selected frequency substantially greater than the selected frequency rate of the reference signal. Typically in one embodiment, the square wave output frequency rate will be about 8.5 kilohertz, whereas the selected frequency rate of the reference signal will be 400 Hz. Thus, the output of the pulse-width modulator is a square wave which is pulse-width modulated by the AC reference signal which in the preferred embodiment is a 400 Hz reference signal. The output of the pulse width modulator is then applied to an amplitude modulator which also receives and combines therewith the DC reference command signal to provide a drive signal which comprises the pulse width modulated signal which is also amplitude modulated by the DC reference command signal. There is also provided a lowpass filter which receives the drive signal and passes substantially only those frequencies which are no greater than the selected frequency of the AC reference signal which in the preferred embodiment is 400 Hz. This lowpass filter which in a preferred embodiment is a Butterworth filter provides a filtered AC drive signal which is amplitude modulated according to the DC reference command signal and which has a frequency substantially the same as the AC reference signal, or 400 Hz.

BEST MODE FOR CARRYING OUT THE INVENTION

Figure 2:
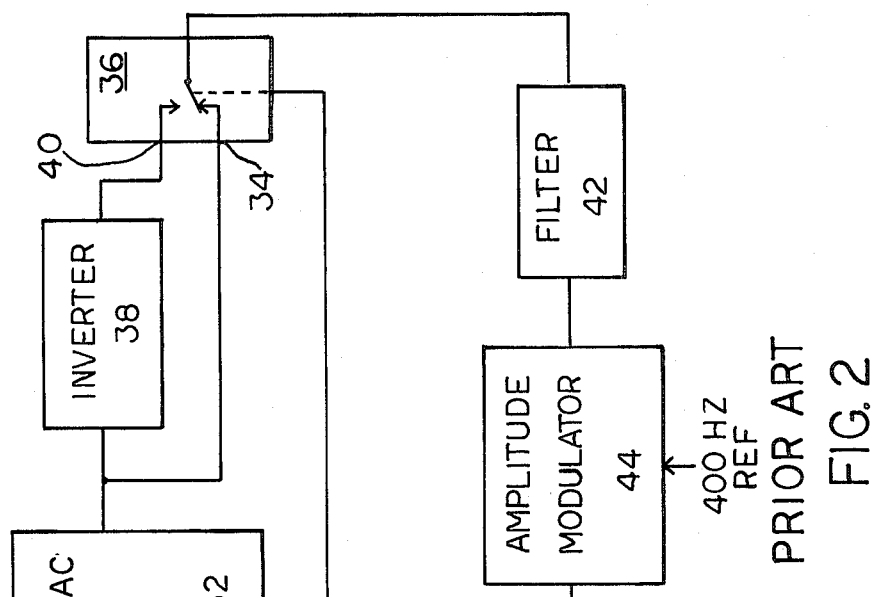
FIG. 1 and FIG. 2 are block diagrams of prior art synchro-driving circuits.
Figure 1:
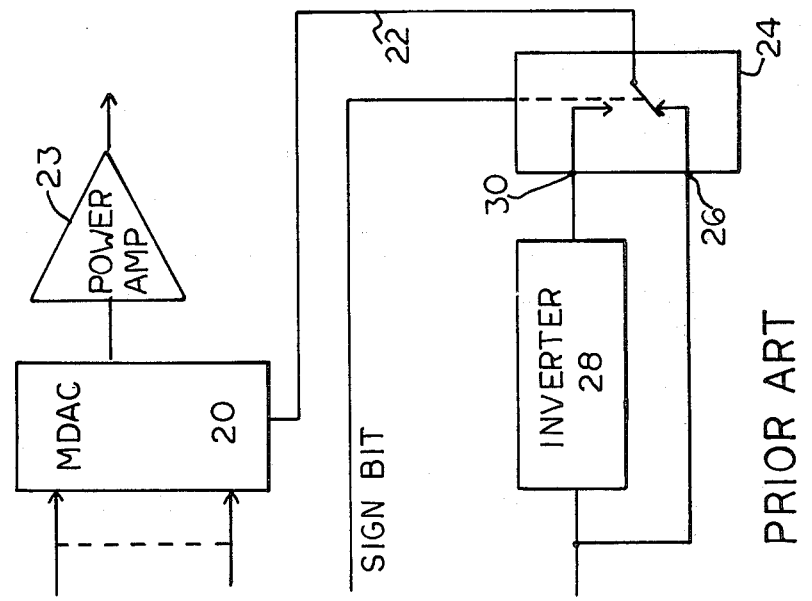
Figure 3:
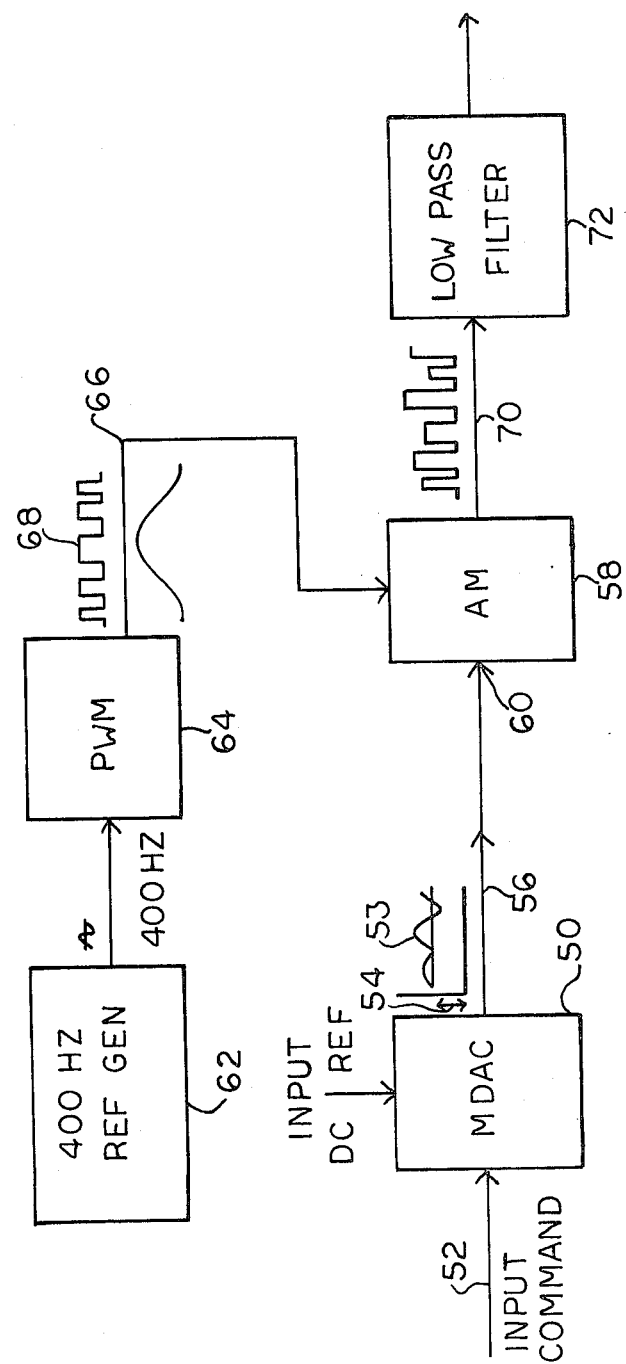
FIG. 3 is a block diagram of the basic circuitry incorporating the features of this invention.

Referring now to FIG. 3, there is shown a block diagram incorporating the basic components of the resolver circuitry of this invention. As is shown, a suitable combining means such as MDAC 50 (Multiplying Digital to Analog Converter) receives an input command signal on line 52 which signal contains information representative of the desired position of the synchro resolver. Although, only one circuit is shown, it will be appreciated that resolvers typically use two driver coils, and therefore in actual practice two circuits of the type shown in FIG. 3 are necessary. Also received at means 50 is an input DC reference voltage such as, for example, a 7.5 volt DC input. The combining means 50 then combines the input command signal and the input DC reference signal to provide an output DC voltage having a level which varies in response to the input command signal. As an example, the simple wave shape shown at 53 shows a varying DC voltage which is offset a selected level. The voltage level 54 represents the DC reference voltage. This DC referenced command signal on line 56 from combining means 50 is then provided to amplitude modulator 58 at port 60. There is also provided a generating means such as for example, 26 volt AC 400 Hz reference generator 62. The 26 volt 400 Hz signal from reference generator 62 is then applied to a pulse width modulator 64 which provides a high frequency square wave output on line 66. The high frequency square wave output has a frequency substantially higher than that of the 400 Hz reference signal, and in a preferred embodiment is 8.5 kHz. In addition, the high frequency output square wave is pulse width modulated by the 400 Hz signal.

Therefore, it will be appreciated that the square wave as shown at 68 will vary from very narrow pulses on the low side of the 400 Hz signal to very wide pulses at the peak of the 400 Hz signal. Thus, it will be appreciated there has been provided a high frequency square wave output which is pulse width modulated by the 400 Hz reference signal. This high frequency pulse width modulated output on line 66 is applied to amplitude modulator 58. Amplitude modulator 58 combines the high frequency pulse width modulated square wave signal with the DC referenced command signal to provide an output on line 70 which output signal is the pulse width modulated signal from line 66 which has been further modulated by the variable DC referenced command signal received at line 60 such that now the output on 70 is an amplitude/pulse width modulated high frequency square wave signal which will be referred to hereinafter as the drive signal. The drive signal on line 70 is then provided to lowpass filter 72, which is selected such that it does not pass frequencies higher than the 400 Hz reference signal. It has been found to be particularly desirable to use a 4 pole Butterworth filter for this purpose. Thus, the output of lowpass filter 72 is an amplitude modulated 400 Hz signal. This 400 Hz signal may then be used after proper amplification and conditioning to drive one of the synchro-resolver coils. Thus, there has been described to this point new driver circuitry for resolvers.

Figure 4A:
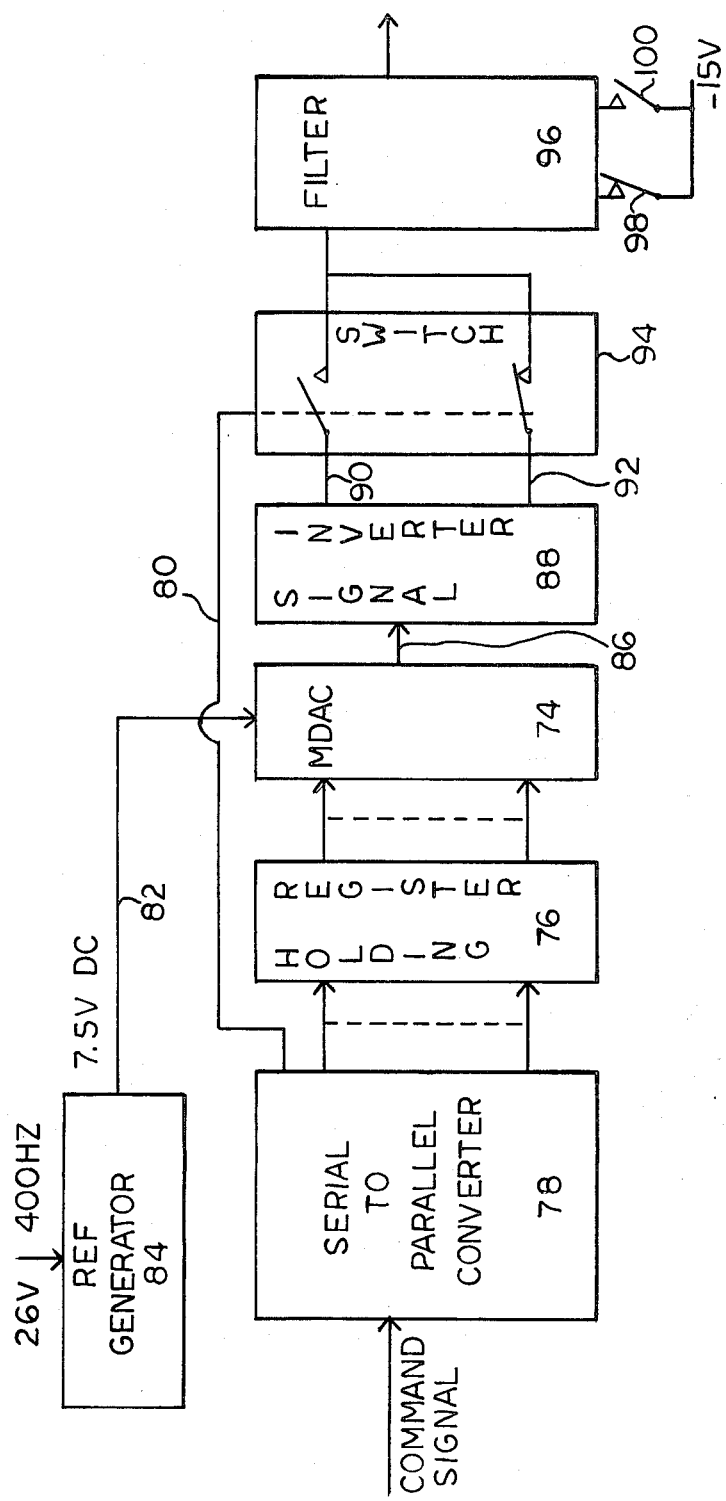
FIG. 4 is a block diagram of a preferred embodiment of this invention.
Figure 4B:
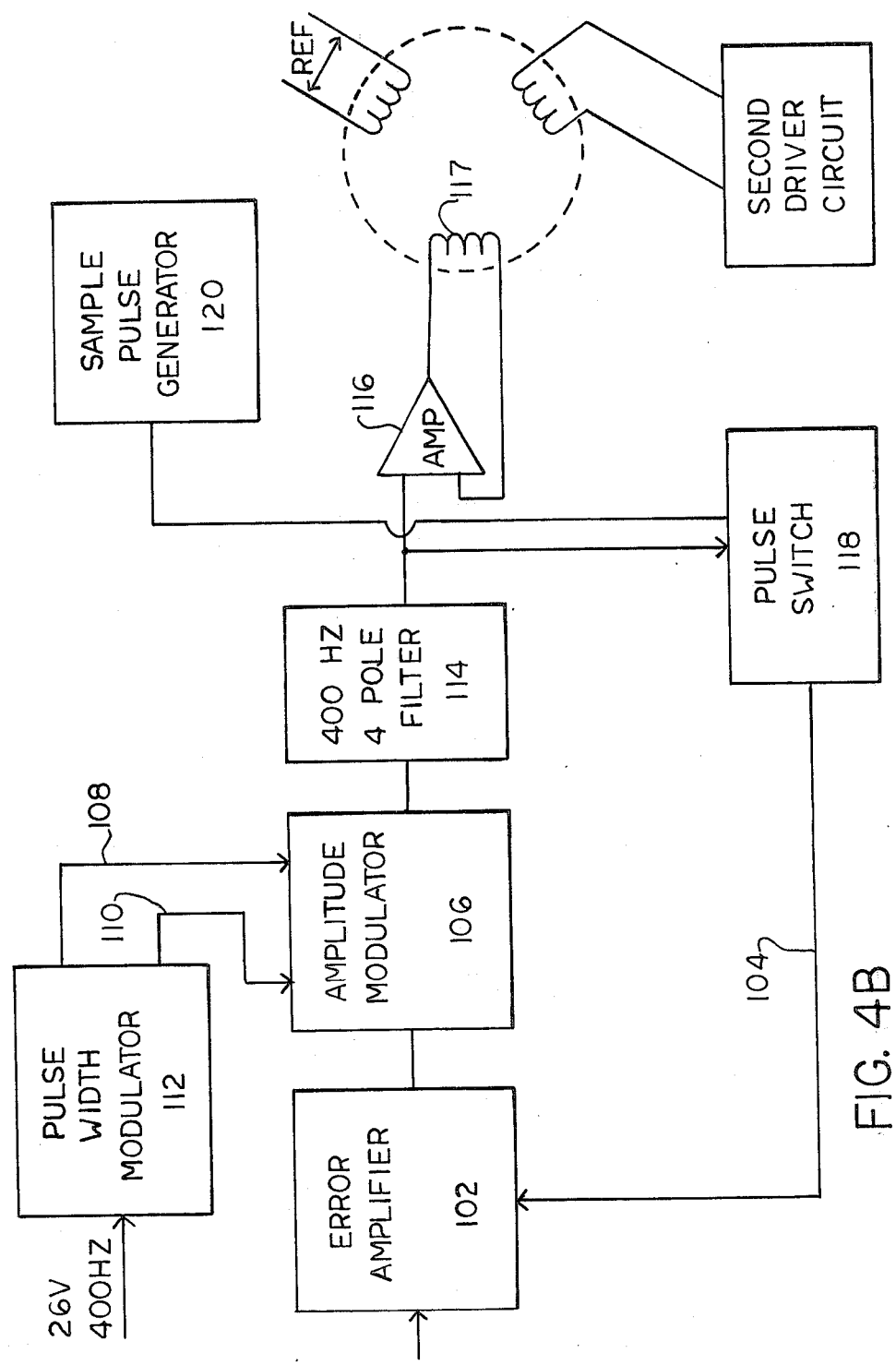

As was discussed heretofor one of the difficulties with respect to the prior art driver circuits is the inability to effectively filter out the computer update stepping rate such that this noise does not reach the synchro driver coil itself. In addition, to achieve greater accuracy it will be appreciated that a suitable feedback loop in the circuitry may well be desirable. Therefore, referring now to FIG. 4, there is shown a preferred embodiment of the present invention which is suitable for receiving serial, digital data from a computer means, which effectively filters the computer update rates and which also provides an unusually effective feedback loop. As is shown, the circuitry of this preferred embodiment includes a MDAC (Multiplying Digital to Analog Converter) 74 as did the basic circuitry of FIG. 3. However, as is shown, MDAC 74 receives parallel digital information as is indicated by the multiplicity of lines from hold register 76. It will also be appreciated, that although many resolver applications including certain aircraft simulation applications may well use a parallel digital data transmission system, it is possible to use this invention with a serial digital data system such as that described in application Ser. No. 795,320 which application is assigned to the same assignee as the present invention. Thus, in this preferred embodiment there is also shown a serial to parallel digital converter 78. The serial to parallel digital converter simply accepts the data in serial format and converts it to parallel digital format where it is then held in storage register 76 until ready for use by MDAC 74. Register 76 also provides a sign bit signal on line 80 which will be discussed hereinafter. As was discussed heretofore with respect to FIG. 3, the MDAC of this system receives an input DC reference signal such as shown on line 82. Although this reference signal may be obtained by any suitable technique, it has been found that it is particularly desirable and effective to tie the output signal on line 82 to the 26 volt 400 Hz power source. Thus, there is shown a reference generator 84 which receives the 26 volt 400 Hz signal and ties the DC output level on line 82 to this AC signal. In the particular embodiment shown in this drawing, it has been found to be particularly useful to have an output voltage of approximately 7.5 volts DC when the output AC voltage is 26 volts, 400 Hz. Thus, it will be appreciated that the output of MDAC 74 on line 86 is a variable DC voltage which uses the 7.5 volt DC reference voltage from reference generator 84 as a base and which varies around this base according to the command signal received from hold register 76. The DC referenced command signal on line 86 is then provided to a signal inverter 88 which provides an output on line 90 substantially the same as the input on line 86 and provides an inverted output on line 92 which is inverted or opposite in sign from the output on line 90. The positive voltage on line 90 and the negative voltage on line 92 are each provided to a switching circuitry 94 which is controlled by the sign bit on line 80 from hold register 74. Thus, as can be seen from the schematic representation of switch 94 (which may of course be an electronic switch) depending upon the sign bit, either the positive signal on line 90 or the negative signal on 92 is provided to response filter 96. The response of filter 96 can selectively be set by selectively opening and closing switches 98 and 100 such that the output of response filter 96 to error amplifier 102 has effectively been filtered such that the stepping noise or computer update rate has been substantially eliminated. Error amplifier 102 serves as part of the feedback loop of this invention which will be discussed hereinafter. The error signal on line 104 to error amplifier 102 is combined with the output of response filter 96 to achieve the desired command drive signal. The output of error amplifier 102 is then applied to amplitude modulator 106 as the modulating variable DC voltage. Amplitude modulator 106 receives two high frequency pulse-width modulated square wave signals on lines 108 and 110 which are the inverse of each other. The two pulse-width modulated signals are provided by a pulse width modulator 112 which is similar to that discussed heretofore with respect to FIG. 3. The pulse width modulator 112 receives a 400 Hz 26 volt signal as the pulse width modulating signal. Thus, the high frequency square wave (such as a 8.5 kHz square wave) is modulated by the 400 Hz 26 volt AC signal to provide a high frequency square wave signal which is pulse-width modulated by the 26 volt 400 Hz signal. Thus, as is shown more clearly in FIG. 5, each of the pulses from pulse width modulator 112 varies according to the amplitude of the 400 Hz AC reference signal. Inverting circuitry, as will be discussed hereinafter, contained within pulse width modulator 112 also provides the inverse of the pulse width modulator signal 108 on line 110. Thus, it will be appreciated that two high frequency square waves are provided to amplitude modulator 106 and each of these square waves is pulse width modulated by a 26 volt 400 Hz reference signal. The two pulse width modulated signals are the inverse or have 180° phase shift with respect to each other. Thus, as will be discussed hereinafter and depending upon the sign of the output of error amplifier 102 one of the pulse width modulated signals received on lines 108 and 110 is amplitude modulated by the control signal from error amplifier 102 to provide at the output of amplitude modulator 106 a amplitude/pulse width modulated signal to the 400 Hz 4 pole filter 114. As was discussed heretofore, the output of 400 Hz 4 pole filter 114 (which is preferably a 4 pole Butterworth filter) is an amplitude modulated 400 cycle signal. This output is then provided to power amplifier 116 which in turn drives a synchro resolver coil 117.

As was discussed heretofore it was very difficult in the prior art to provide any sort of suitable feedback loop. However, according to this invention the output of filter 114 is also connected to a sampling switch 118 which is used as part of a feedback loop. Sampling switch 118 operates to provide a short sample pulse of the output signal back to error amplifier 102. The sample period is determined as follows. A sample pulse generator 120 is connected and controlled by 26 volt 400 Hz reference signal such that a short duration pulse, (such as for example approximately 80 microseconds) is provided when the 400 Hz signal is at its peak positive voltage. The duration of this pulse and its timing is more clearly illustrated in FIG. 6. This pulse signal which is representative of the peak 400 Hz voltage is then applied to sampling switch 118 such that the loop between the output of the filter 114 and the error amplifier 102 is closed during the pulse period. Thus, it will be appreciated that the error signal is selected to occur only at the peak of the 400 cycle reference signal. Thus, to this point there has been described the general operation of the preferred embodiment of this invention.

Figure 7:
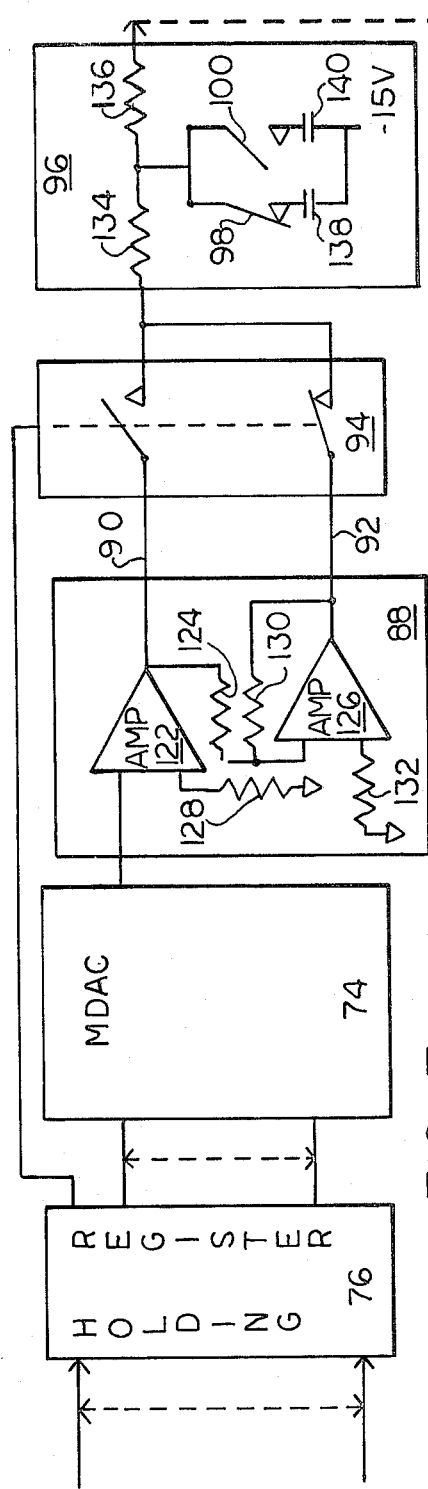
FIGS. 7 through 12 show detail circuitry of various components suitable for use with this invention.
Figure 8:
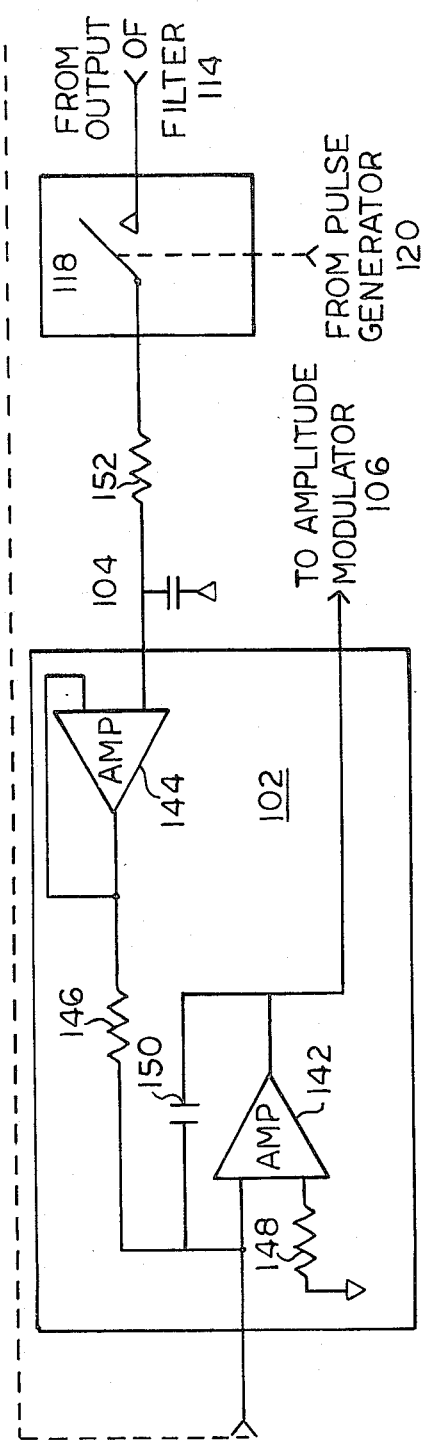

Referring now to FIGS. 7 through 12 there is shown more specific details of the circuitry of the preferred embodiment of this invention. As is shown in FIG. 7, holding register 76 may be a simple two-sectioned 8-bit each output data buffer as is shown at 76 and which provides a parallel digital data signal to MDAC 74 upon command. The MDAC 74 is a basic unit such as is commercially available from Analog Devices, Norwood, Mass., and identified as part no. AD 7520. The output of MDAC 74 is then provided to signal inverting circuit 88 which includes an amplifier 122 which output is connected by line 90 directly to switching circuit 94, and through resistor 124 to an inverting amplifier 126. Amplifiers identified with part no. LM 747 from the National Semiconductor company have been found to be particularly useful for use as amplifiers 122 and 126. In addition, there is shown biasing and feedback resistors 128, 130, and 132 having values as will be discussed hereinafter for the proper circuit operation. Thus, it will be appreciated that the output of amplifier 122 on line 90 is fed to one input of switch 94 while the same output is also fed to inverting amplifier 126 such that an inverted version of the signal on line 90 is applied to switch 94 by line 92. Response filter 96 is comprised of resistors 134 and 136, and capacitors 138 and 140. Filter 96 receives the signal from switch 94 to provide a filtered response which can be selectively changed by the operation of switches 98 and 100 to connect and/or disconnect capacitors 138 and 142 with respect to the rest of the circuitry. The output of response filter 96 is then applied to error amplifier 102 which is comprised of a first amplifier 142 which is similar to amplifiers 122 and 124 discussed heretofore. The output of amplifier 142 is therefore the basic signal which is passed to the 4 pole Butterworth filter 114 which in turn drives power amplifier 116 and subsequently the coil 117 of the resolver. Error amplifier circuitry 102 further includes a buffer amplifier 144 also similar to amplifiers 122, 124 and 142, which receives the pulse sample from switch 118. Also connected to the amplifiers 142 and 144 are properly selected dropping resistor 146, biasing resister 148, and capacitor 150. The input to amplifier 144 is, as was discussed heretofore, on line 104. Sample switch 118 is also shown with a dropping resistor 152 connected between sample switch 118 and amplifier 144. The values of these circuit components will be provided hereinafter.

Figure 9:
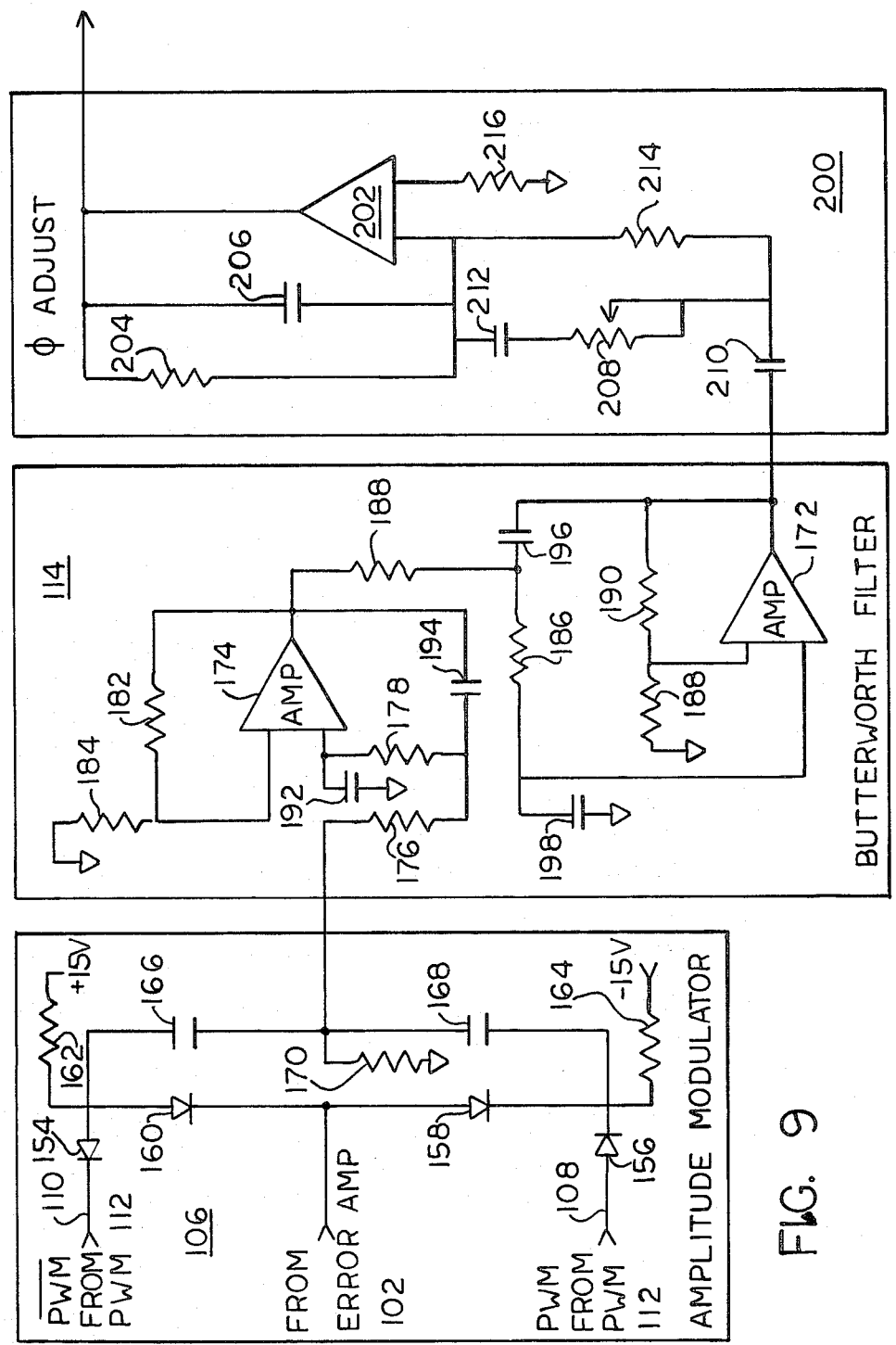

Suitable circuitry for amplitude modulator 106 has been found to include the simple circuitry shown in FIG. 9. This circuitry which provides modulation of the two pulse width modulated signals received on lines 108 and 110 is modulated by the drive signal received from error amplifier 102. As is seen, the circuitry simply comprises diodes 154, 156, 158, and 160, biasing resistors 162 and 164 and the two capacitors 166 and 168 whose center points are grounded by resistor 170. The modulator selects the PWM signal on line 108 or the $\overline{PWM}$ signal on line 110 depending on whether the drive signal from error amplifier 102 is positive or negative. This signal from error amplifier 102 varies the amplitude of one of the PWM signals according to the amplitude of the control signal. The 400 Hz is then obtained at the output of the Butterworth filter 114 by filtering the 400 Hz from the PWM or $\overline{PWM}$ signal such that a variable amplitude signal at 400 Hz with 0° to 180° phase relative to the 400 Hz 26 volt reference is obtained. The Butterworth filter is a 4 pole Butterworth filter comprised of two similar amplifiers 172 and 174 which are available as part nos. LM 324 from National Semiconductor Co., Santa Clara, Calif.

These amplifiers are connected with the resistors 176 through 190 and capacitors 192 through 198 as shown. The output of Butterworth Filter 114 may then, if desired, be provided to a small phase adjusting circuitry 200 for purposes of removing any small channel-to-channel errors in phase of the two resolver coils. Values of the components of the amplitude modulator and the Butterworth filter will be provided hereinafter.

Phase adjustment circuit 200 is used to take out small channel-to-channel errors in phase that might result because of the various components in the Butterworth filter and other circuitry. The phase adjustment circuit comprises an amplifier 202 of the same type discussed heretofore with respect to the Butterworth filter and further includes feedback circuitry and biasing resistors as neccessary. For example, resistor 204 and capacitor 206 provides a feedback loop for the small phase adjustment circuitry. In addition, there is a potentiometer 208 a capacitor 210 and 212 and another dropping resistor 214. The circuitry is biased by a biasing resistor 216. The values of these resistors and capacitors will be provided in detail hereinafter.

Figure 6:
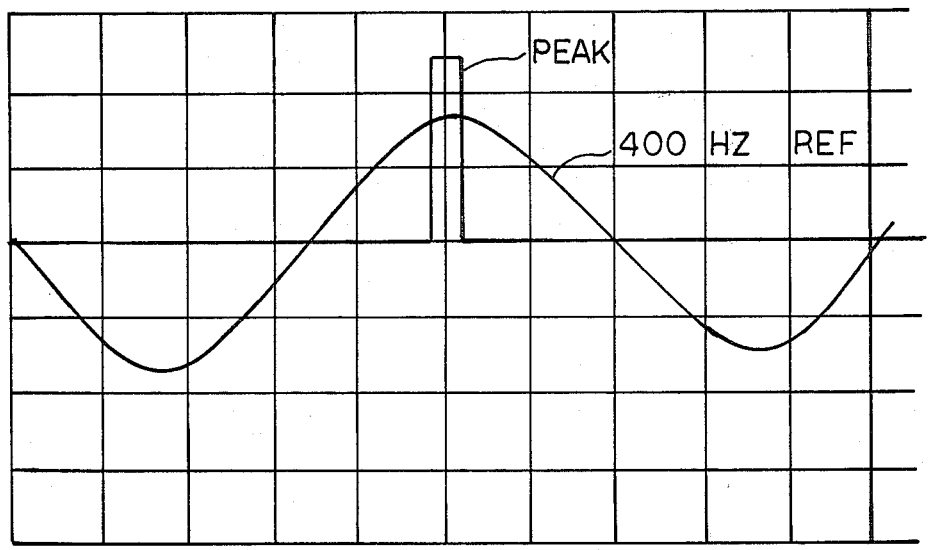
FIG. 6 shows the timing of a sample pulse signal wave shape with a 400 Hz signal.
Figures 10, 11:
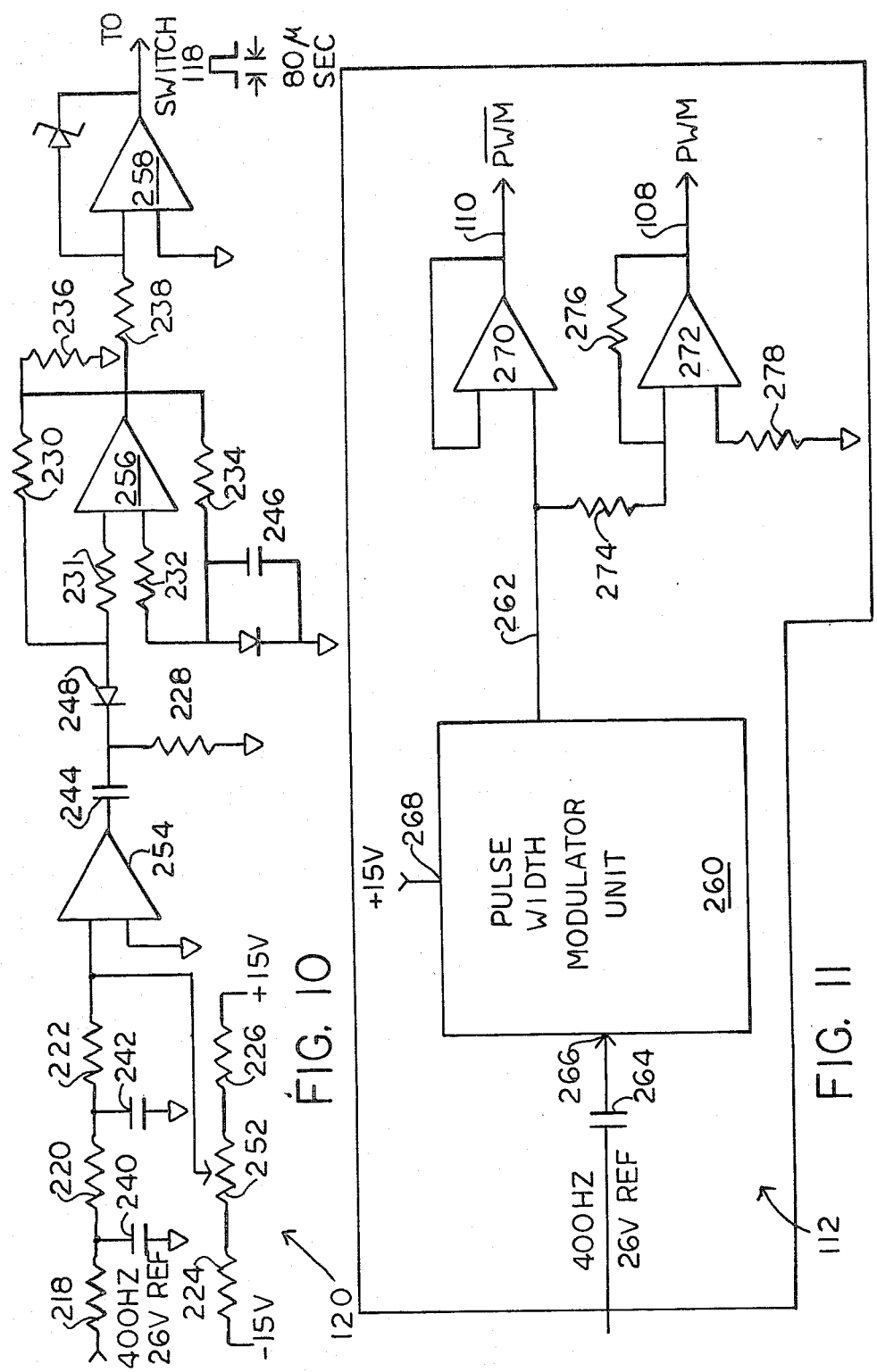

Referring now to FIG. 10, there is shown a detailed schematic diagram of pulse sample generator 120. This circuitry provides a pulse which is approximately 80 microseconds wide and which occurs so that the trailing edge of the pulse is at the peak of the sampled wave. FIG. 6 shows the corresponding timing of the sampled wave and the pulse. As will be appreciated by those skilled in the art, the pulse is generated by a variable phase zero crossover detector and a mono-stable circuit. The values of the various resistors 218 through 238, capacitors 240 through 246 diodes 248 and 250 and potentiometer 252 are given hereinafter. Amplifiers 254, 256 and 258 are the same as was discussed heretofore with respect to Butterworth filter 114.

Figure 5:
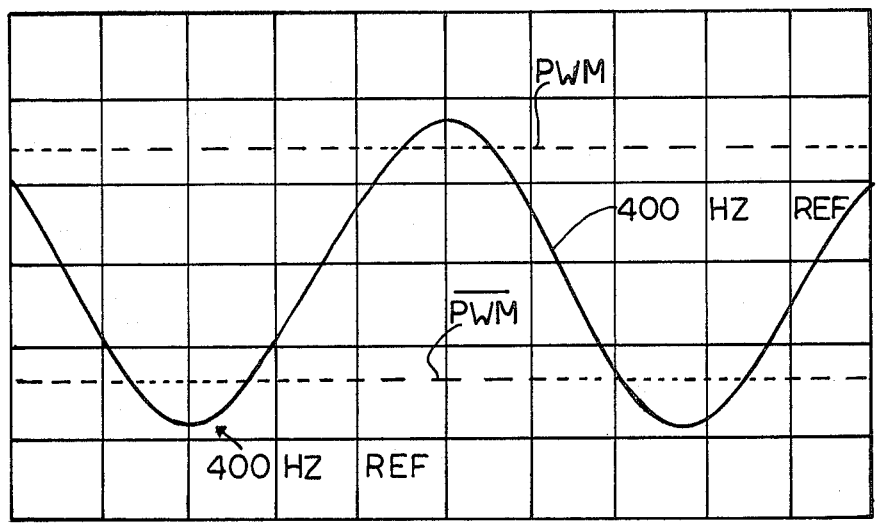
FIG. 5 shows the output wave shape of a high frequency square wave pulse width modulated by a 400 Hz signal.

Referring now to FIG. 11, there is shown circuitry for the pulse width modulator 112. According to this circuitry, a 400 Hz 26 volt RMS reference signal is provided to the pulse width modulator circuitry 112. Modulator chip 260 provides high frequency square wave which is pulse width modulated by the 400 Hz signal to provide an output on line 262. The chip is of a type readily available from Signetics Corporation, Sunnyvale, Calif., and identified by part no. NE 556 and is biased by resistors and capacitors not shown such that it provides a 8.5 kHz square wave output. The 8.5 kHz output is pulse width modulated by the 400 cycle 26 volt signal received through capacitor 264 and applied at port 266. Modulator 260 also receives a 15-volt power source at port 268. The output of modulator 260 on line 262 is as shown in FIG. 5. Pulse width modulated high frequency square wave as is clearly seen in FIG. 5 has a pulse width which varies with respect to the amplitude of the 400 Hz input. Thus, as can be seen the width of the pulses are broad as the 400 Hz wave increases to a peak positive voltage and are narrow as the 400 Hz wave decreases to a minimum peak voltage. This pulse width modulated high frequency square wave is then applied to amplifiers 270 and 272 which are appropriately connected such that the output of amplifier 270 is an amplified version of the pulse width modulated signal on line 262 while the output of amplifier 272 is the inverse or negative. Resistors 274, 276 and 278 are also connected as shown to properly bias and provide the PWM and $\overline{PWM}$ signals.

As was referred to heretofore, MDAC 74 preferrably receives a 7.5 volt DC reference signal. This reference signal is provided from reference generator 84, and is locked or tied to the 26 volt 400 Hz excitation voltage such that under high, low or variable excitation voltage conditions, the DC reference will vary accordingly.

Figure 12:
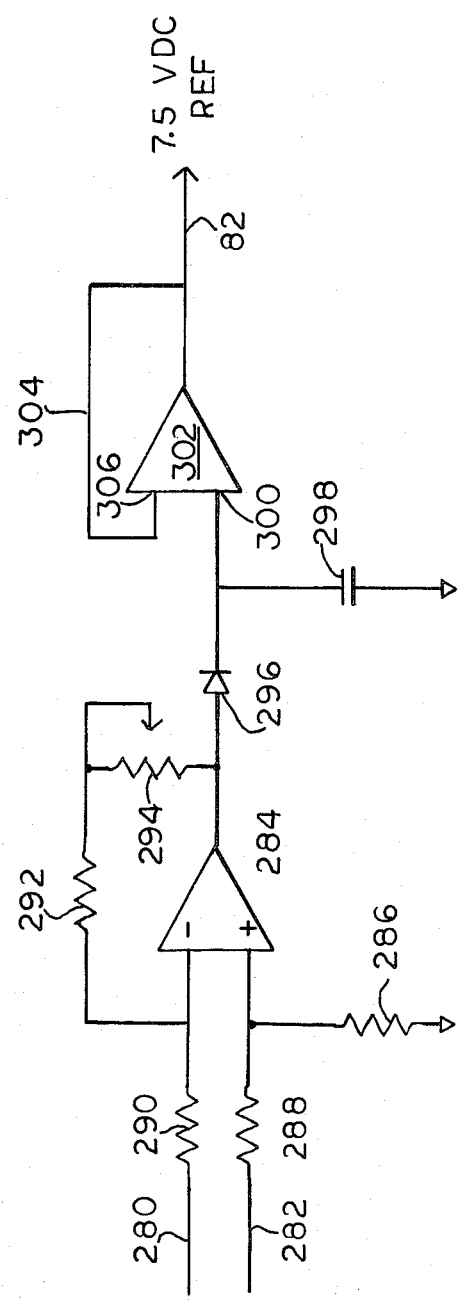

Referring now to FIG. 12, there is shown a detailed circuit schematic of the 7.5 volt DC reference voltage source. The 400 Hz 26 volt AC signal is received on line 280 while its reference is received on line 282. These inputs are applied to amplifier 284 which is preferably an amplifier similar to the amplifier used in pulse width modulator 112 and error amplifier 102. A signal as determined by biasing resistors and dropping resistors 286, 288 and 290, feedback resistor 292 and potentiometer 294 is then provided through diode 296 and capacitor 298 to achieve a substantially constant DC voltage level into port 300 of amplifier 302. Amplifier 302 is preferably the same type amplifier as amplifier 284 discussed heretofore. A feedback line 304 connects the output of amplifier 302 to its second input port 306. Thus, the output on line 82 is a constant 7.5 volt DC which will vary, however, according to changes in the 26 volt 400 Hz exitation voltage.

Values of resistors 124, 128, 130 and 132 in signal inverter 88 are 10KΩ, 4.99KΩ, 10KΩ and 4.99KΩ respectively. Values for filter 96 resistors 134 and 136 are 10KΩ, and for capacitor 138 and 140 are 47 μF and 20 μF respectively. The values of error amplifier resistors 146, 148 and 152 are 10KΩ, 15KΩ and 220Ω, respectively, and the value of capacitors, 150 and 104 are 20 μF and 47 μF respectively. The values of the resistors in amplitude modulator are 10KΩ, 10KΩ and 350KΩ for resistors 162, 164 and 170 respectively. Capacitors 166 and 168 are both 0.01 μF. All of the resistors (176 through 190) in Butterworth filter 114 are 33KΩ, and all of the capacitors (192 through 198) are 0.01 μF. Potentiometer 208 in phase adjust circuit 200 is 100KΩ, and 204, 214 and 216 are 100KΩ, 10KΩ and 10KΩ respectively. The values of capacitors 206 and 212 is 0.01 μF and that of capacitor 210 is 0.47 μF.

The values of the various resistors 218 through 228 in sample pulse converter 120 are 18.7KΩ, 40.2KΩ, 1 megΩ, 6.65KΩ, 10KΩ, 1KΩ, respectively, whereas all of the resistors 230 through 238 are 10KΩ. Capacitors 240 through 246 are all 0.01 μF. Resistors 274, 276 and 278 of pulse width modulator 112 are 10KΩ, 10KΩ and 4.99KΩ respectively whereas the value of capacitor 264 is 0.01 μF. The values of resistors 286 through 292 are 10KΩ, 51.1KΩ, 51.1KΩ, and 11KΩ respectively. Capacitor 298 is 0.47 μF.

Therefore, what have been described are presently considered to be preferred embodiments of this invention, and it will be obvious to those skilled in the art that various changes and modifications may be made therein without departing from the invention, and the invention is therefore intended to cover all of its changes and modifications as are in the true spirit and scope of the invention.

I claim:

1. Circuitry for driving a resolver coil comprising:
    means for receiving and combining a DC reference voltage and an input command signal, and for providing a DC referenced command signal, said DC referenced command signal being a variable DC signal having a first selected level which varies in response to said input command signal;
    means for providing an AC reference signal having a selected amplitude and a selected frequency;
    a modulator for providing a pulse width modulated square wave output, said square wave output having a selected frequency substantially greater than said selected frequency of said AC reference signal, and said square wave output further being pulse width modulated by said AC reference signal;
    an amplitude modulator for receiving and combining said pulse width modulated square wave and a selected DC referenced command signal to provide a drive signal, said drive signal comprising said pulse width modulated square wave which is further amplitude modulated by said selected DC referenced command signal; and
    a lowpass filter for receiving said drive signal and for passing substantially only those frequencies no greater than said selected frequency of said AC reference signal to provide a filtered AC drive signal which is amplitude modulated according to said selected DC referenced command signal and has a frequency substantially the same as said selected frequency of said AC reference signal.

2. The circuitry of claim 1 and further comprising a DC generator for providing said DC reference voltage, said DC generator connected to said AC reference signal providing means such that said DC reference voltage is responsive to said AC reference signal.

3. The circuitry of claim 1 or 2 and further comprising a signal inverter for receiving said DC referenced command signal and for providing an inverted form of said DC referenced command signal, a switching circuitry for receiving said DC referenced command signal and said inverted DC referenced command signal and for selectively providing one of said signals as said selected DC referenced command signal.

4. The apparatus of claim 3 and further including a filter for eliminating or substantially reducing noise signals such as computer update stepping noise signals.

5. The circuitry of claim 4 and further including means for amplifying said filtered AC drive signals.

6. The circuitry of claim 5 and further including a pulse generator which provides a pulse of a selected duration at the peak of said reference AC signal, gating means which samples said filtered AC drive signal during the duration of said pulse and an error amplifier for receiving said sample and combining said sample with said selected DC reference command signal to provide a feedback loop.

7. The circuitry of claim 6 wherein said input command signal is a parallel digital signal and said means for receiving and combining is a multiplying digital to analog converter.

8. The circuitry of claim 7 wherein said square wave output has a selected frequency of 8.5 kHz and said AC reference signal has a selected frequency of 400 Hz.

* * * * *